United States Patent [19]

De'Toffoli

[11] Patent Number: 5,087,380
[45] Date of Patent: Feb. 11, 1992

[54] METHOD AND APPARATUS FOR REMOVING OILY MATERIALS AND FLOATING MATTERS IN GENERAL FROM THE SURFACE OF BODIES OF WATER

[75] Inventor: Mirella De'Toffoli, Pisa, Italy

[73] Assignee: Mytilus S.R.L., Sanremo, Italy

[21] Appl. No.: 474,842

[22] PCT Filed: Mar. 22, 1989

[86] PCT No.: PCT/IT89/00021
§ 371 Date: Sep. 18, 1990
§ 102(e) Date: Sep. 18, 1990

[87] PCT Pub. No.: WO89/09309
PCT Pub. Date: Oct. 5, 1989

[30] Foreign Application Priority Data

Mar. 22, 1988 [IT] Italy ................................ 45204 A/88

[51] Int. Cl.$^5$ ........................ C02F 1/40; B63B 35/32
[52] U.S. Cl. .................... 210/776; 210/242.1; 210/242.3; 210/767
[58] Field of Search ........... 210/776, 242.1, 242.3, 210/242.4, 125, 143, 320, 923, 258

[56] References Cited

U.S. PATENT DOCUMENTS

| | | | |
|---|---|---|---|
| 3,684,095 | 8/1972 | Ayers | 210/242.3 |
| 3,690,464 | 9/1972 | Heinicke | 210/242.3 |
| 3,704,784 | 12/1972 | Craggs et al. | 210/242.3 |
| 3,754,653 | 8/1973 | Verdin | 210/242.3 |
| 3,762,556 | 10/1973 | Penton | 210/242.3 |
| 3,844,944 | 10/1974 | Mercuri | 210/242.3 |
| 3,847,816 | 11/1974 | DiPerna | 210/242.3 |
| 3,862,902 | 1/1975 | Derzhavets et al. | 210/242.3 |
| 3,884,807 | 5/1975 | Heddon | 210/242.3 |
| 3,966,615 | 6/1976 | Petchul et al. | 210/776 |
| 4,119,541 | 10/1978 | Makaya | 210/776 |
| 4,151,081 | 4/1979 | Bolli | 210/242.1 |
| 4,381,994 | 5/1983 | Ayers | 210/242.3 |
| 4,554,070 | 11/1985 | Jordan | 210/242.3 |

FOREIGN PATENT DOCUMENTS

| | | |
|---|---|---|
| 2931795 | 2/1981 | Fed. Rep. of Germany . |
| 83/01265 | 4/1983 | PCT Int'l Appl. . |
| 320986 | 10/1929 | United Kingdom . |
| 2052282 | 1/1981 | United Kingdom . |

Primary Examiner—Robert A. Dawson
Assistant Examiner—Sun Uk Kim
Attorney, Agent, or Firm—Panitch Schwarze Jacobs & Nadel

[57] ABSTRACT

Removal from the surface of bodies of water of oily and floating matters is conducted by preliminarily increasing the concentration of the oily and floating matters in the upper water layers by separating a liquid surface layer sufficiently thick to contain substantially all of the oily and floating matters, simultaneously giving the separated layer a relative speed so as to forward it to subsequent treatment steps with a minimum of or no turbulence, and introducing the separated layer into a basin having a horizontal size relative to the cross-section where the initial separation occurred such as to substantially reduce the relative velocity of the liquid flow, where the level of the liquid in the basin is kept near to the average level of the body of water outside the basin. The water in the basin is caused to have a downward flow direction by sucking from the bottom of the basin, leaving the already separated oil at the surface, thereby increasing its concentration. An upper liquid layer is then withdrawn from the basin surface. The upper liquid layer is forwarded to further decantation treatment where the liquids withdrawn from the surface layers are passed at low speed through an array of communicating tanks from which the water deposited at the bottom is sucked out and discharged while the oil is withdrawn and sent to store. An apparatus facilitating the method and the present invention is also disclosed.

32 Claims, 5 Drawing Sheets

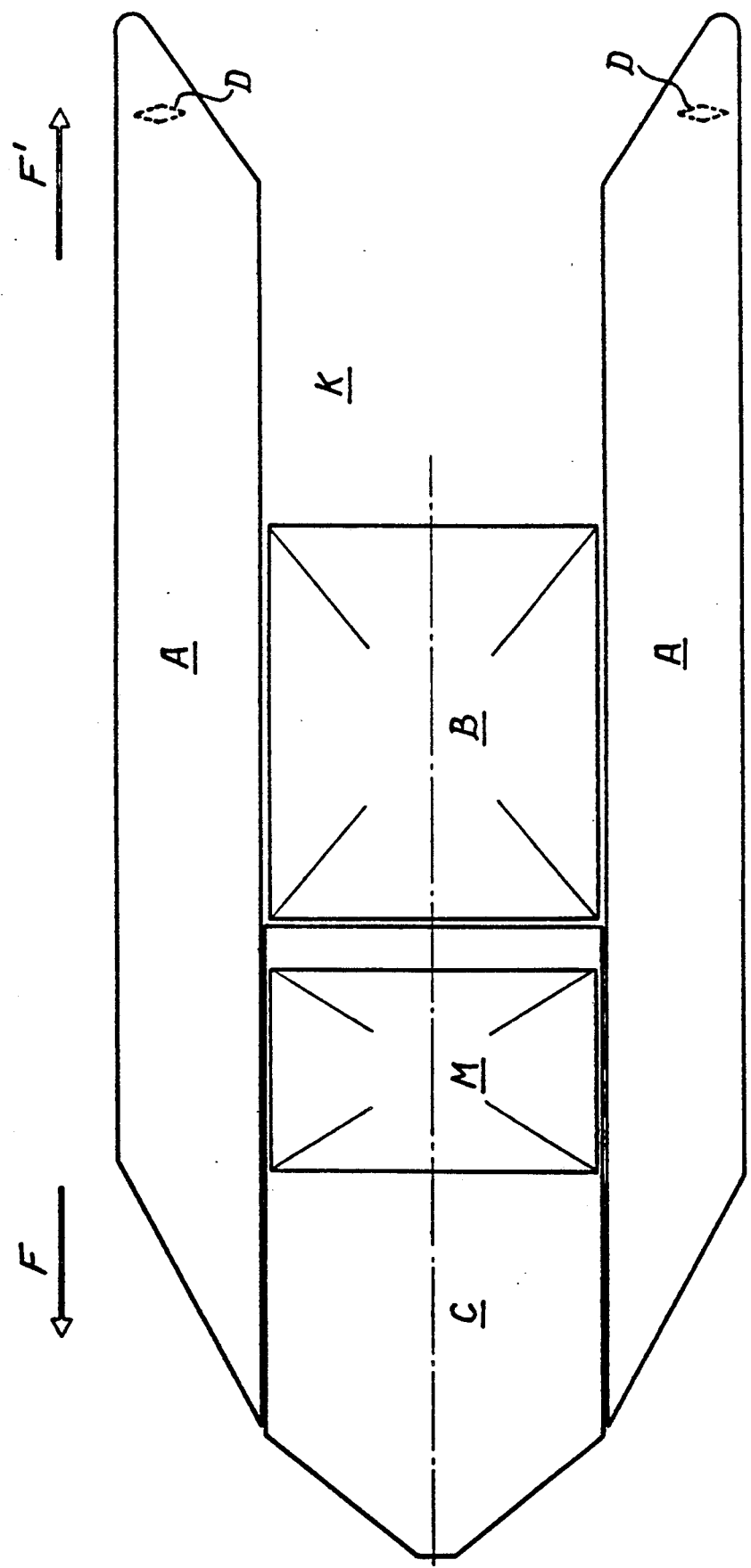

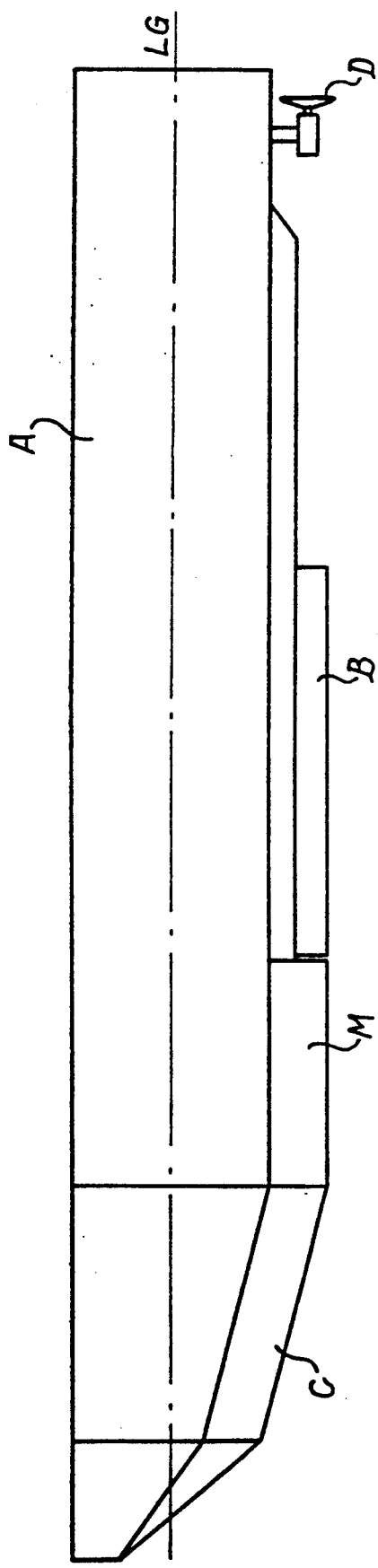
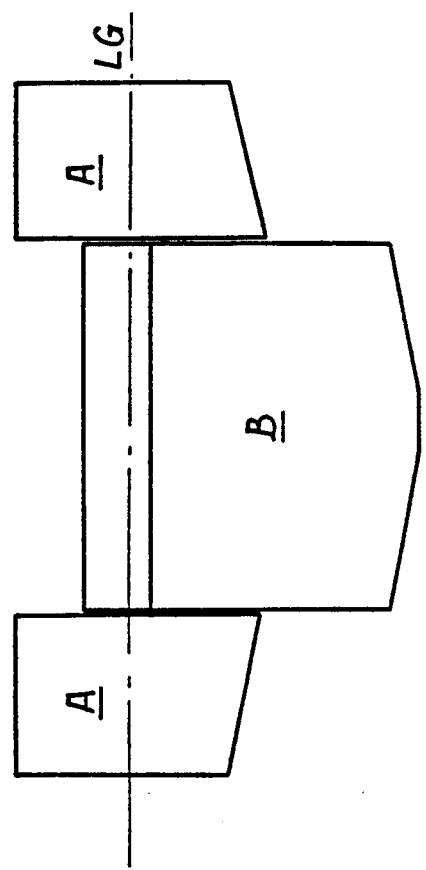
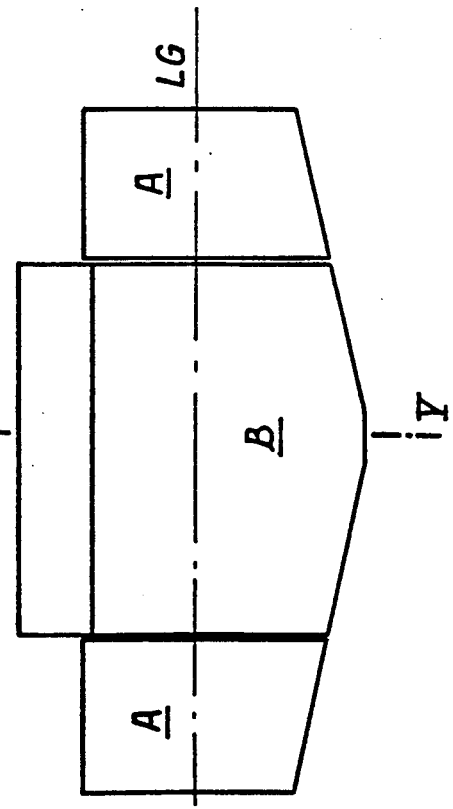

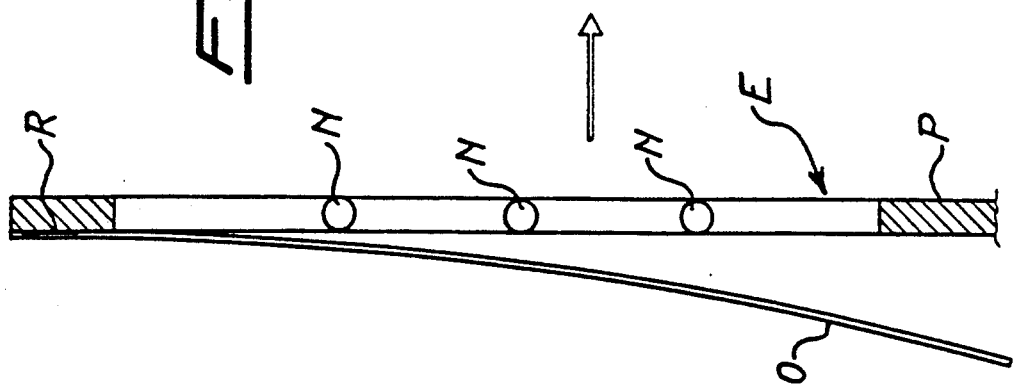
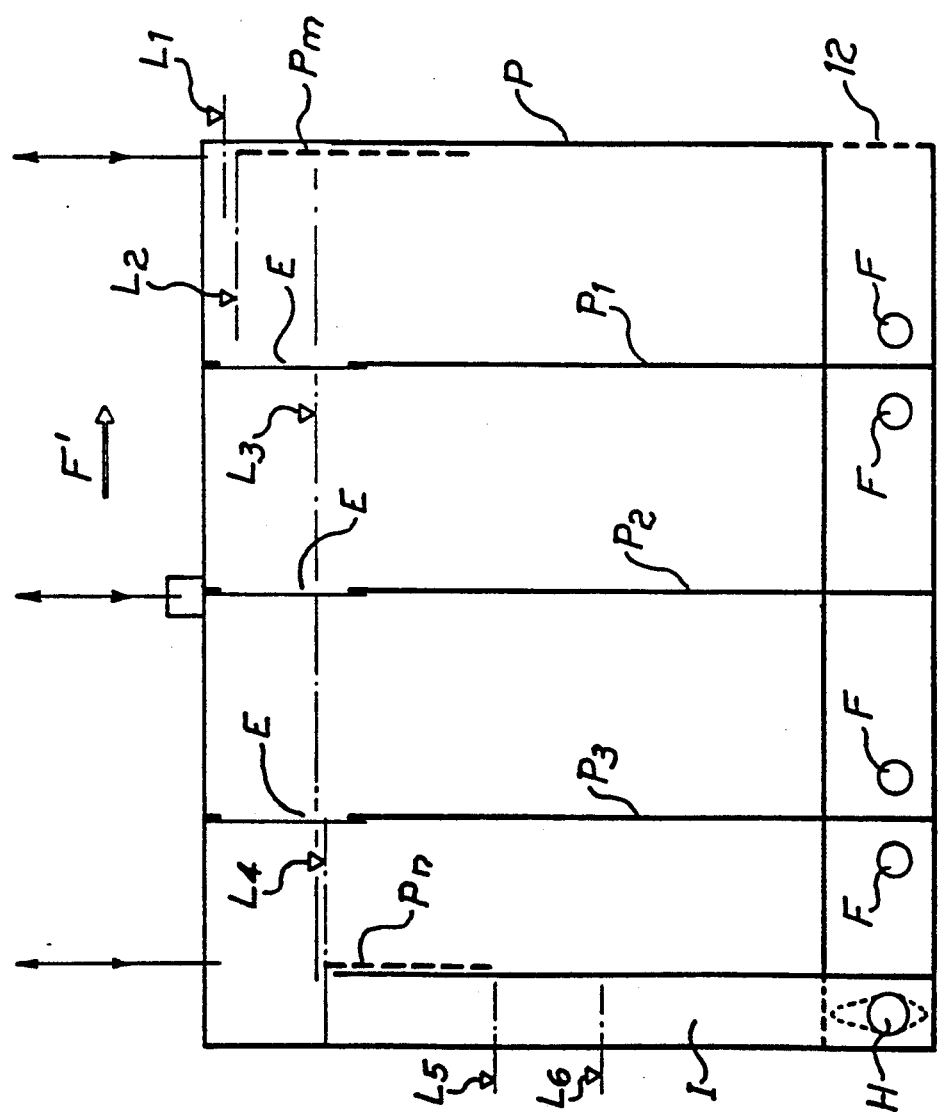

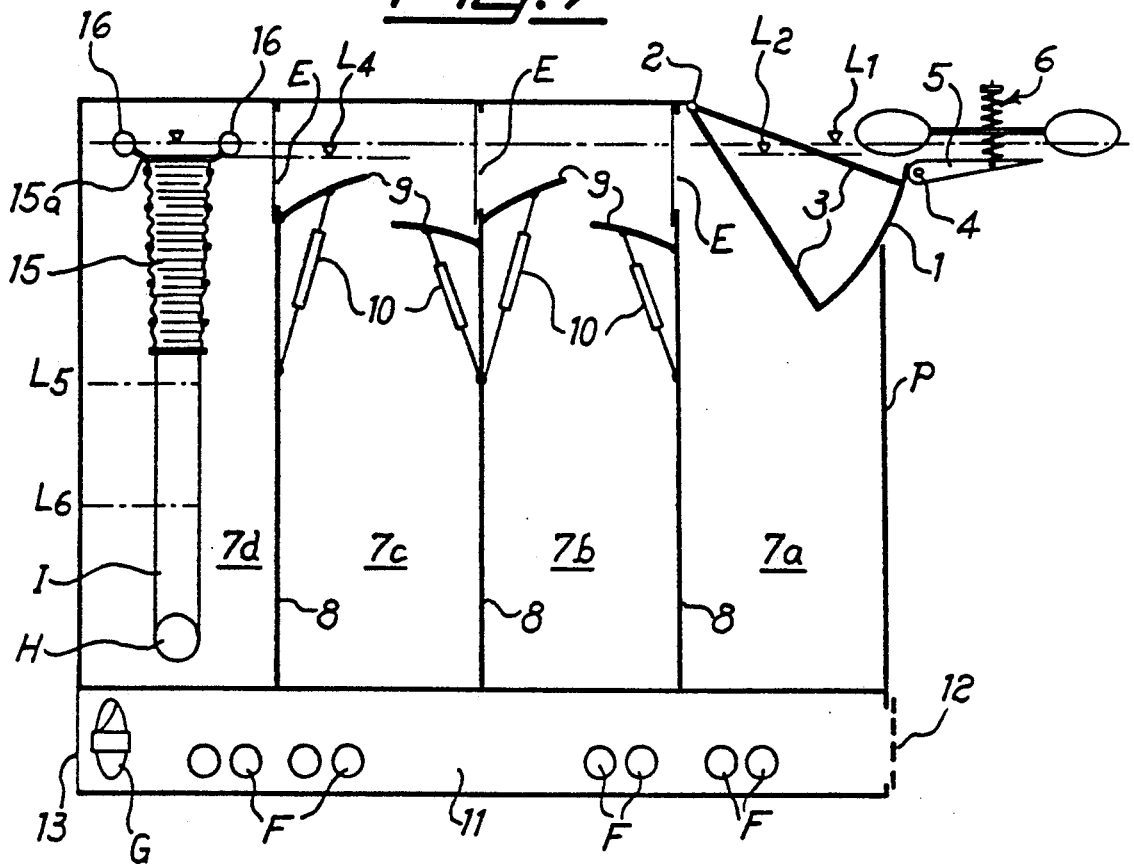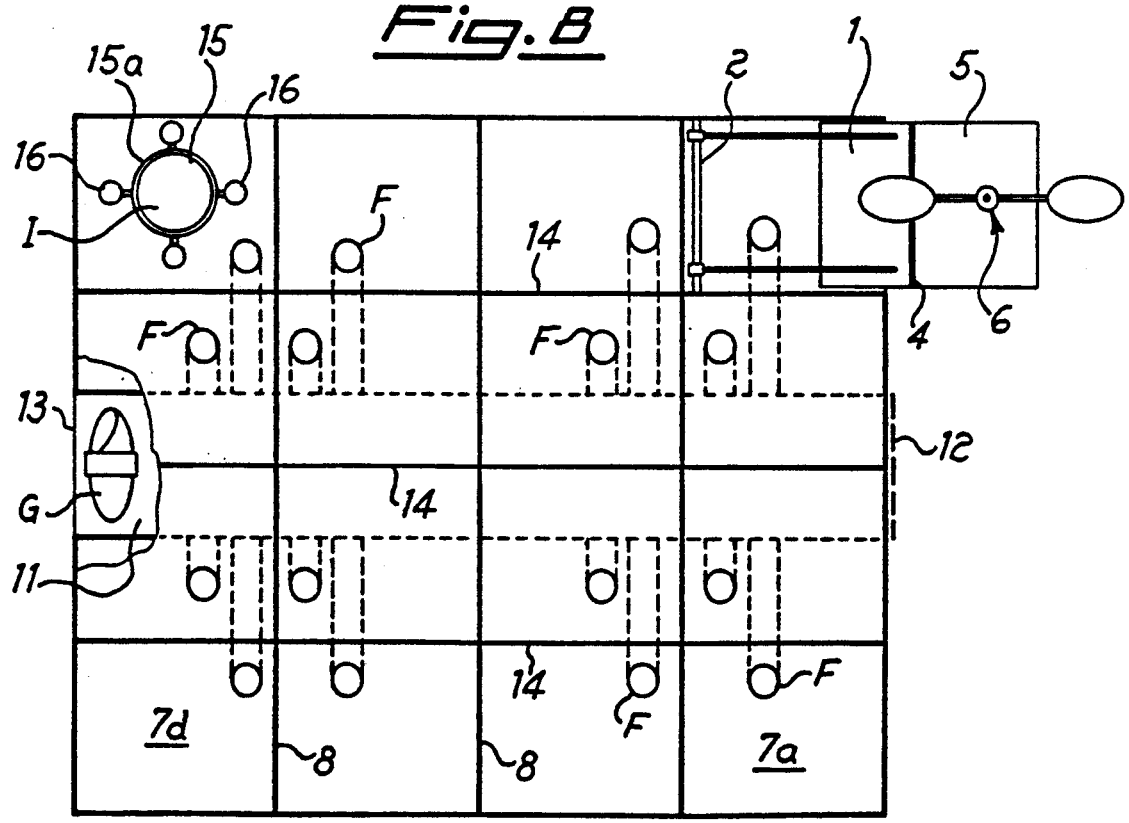

METHOD AND APPARATUS FOR REMOVING OILY MATERIALS AND FLOATING MATTERS IN GENERAL FROM THE SURFACE OF BODIES OF WATER

FIELD OF THE INVENTION

This invention concerns a method for removing oily materials, and floating matters in general, from the surface of bodies of water, as well as an apparatus whereby said method can be put into practical use; both method and apparatus being particularly suitable to operation even on rough sea.

BACKGROUND OF THE INVENTION

A large number of methods and apparatus are known for removing oily and floating waste (which in the following disclosure will be simply designated in general as "oil") from the surface of bodies of water, and in particular from the surface of the sea, of lakes and rivers. For exemplary purposes, reference if made to the method and apparatus described in GB-A-1 206 794, DE-A-2 931 795 and U.S. Pat. Nos. 4,119,541 and 3,684,095. However, said methods and apparatus already known in the art, have considerable drawbacks, and particularly the following:

a) a very low collecting efficiency, further remarkably reduced if an even slight wave motion is present;

b) the oily floating waste is obliged, since already the first step of the process, to pass through a level drop from the sheet of water containing the floating matter to be removed, to the fluid surface within the apparatus performing the process (see U.S. Pat. No. 4,119,541). As a consequence emulsifying and stirring actions are produced between oily matter and water, being previously perfectly separate, one floating over the other, and the effects of these actions have to be subsequently reduced or counteracted thus negatively affecting the efficiency and adding to the structural complexity of the apparatus. For example according to the above-mentioned U.S. patent it is necessary not only to provide anti-emulsion plates 5, 5a, but also to cause water running zigzag with a longer path and to adopt both baffles 14 for maintaining a quiescent region and densitometers for detecting a possible content of oil carried by water beyond the filter. In order to improve separation and stratification of oily matter from water an array of the above-mentioned plates 5, 5a is used, the plates being parallel, slanting suitably spaced apart and provided with tiny holes;

c) those methods and related apparatus based on the principle of enrichment in oil of the floating matter with water being discharged from the bottom and the concentrated oil recovered at the upper layers, such as in U.S. Pat. Nos. 4,119,541 and 3,684,095, require a very complex instrumentation system to control the level differences with respect to the outside, thickness of the concentrated oily layer and percentage of oil in the discharged water. Furthermore these instrumentation systems show some problems in their setup for operating in a smooth body of water and even cannot be used at all when such a body of water becomes slightly rough;

d) all these known processes accomplish their effect in a single operative step, not to be repeated, by subjecting all the fluid under treatment to only one type of process without dividing it into successive steps, each relating to a different physical treatment specifically required to that particular step of the process, thus resulting in a low operational flexibility of the overall process. Therefore the known apparatus only seldom perform in the best operating conditions; e) remarkable transportation problems due to the large size of the apparatus, when they have to work in an even slightly rough sea, and the fact that they cannot be easily disassembled in order to make their transportation easier;

f) a high operation complexity which makes absolutely compulsory a continuous attendance on board of personnel whose safety often puts a constraint to the use of such apparatus, which are further burdened by the logistics of said personnel;

g) unsatisfactory seaworthiness as far as maneuvering and wave motion resistance, especially at sea, even when only slightly rough.

It is an object of the present invention to provide a method and an apparatus for removing oily and in general floating waste matter from bodies of water, which overcome the above-mentioned drawbacks known in the art.

One of the basic features of the present invention resides in the fact that the oily matter floating on the water is concentrated and at the same time separated from the greatest quantity of water as possible still before having to flow through any passage or level drop device which may cause therein some emulsifying and/or stirring action.

Another basic feature of the present invention is that, contrary to the prior art according to which a single, simple process is applied to all the fluid under treatment (see point d) above), a complex process is applied consisting in a combination of various processes, each of which forms systematically part of the global one, is dimensioned according to the quantity of fluid to be treated and is provided with the required auxiliary equipments which are specifically required.

A further basic feature of this invention is the fact oily matter removal may be performed with a constantly high separating efficiency, even in rough sea conditions, and by means of an apparatus whose weight and dimensions are relatively limited, at least compared to similar apparatus already known in the art. That is possible owing to the fact that, on the one hand the collection of the whole amount of oil involved is guaranteed, and on the other hand the amount of water subjected with the oil to the process is the least possible. A further important aspect of this invention, which improves the oil removal efficiency, is the fact that the various phases of preliminary separation and surface concentration of the oil are performed not only without resorting to the use of differential levels or other situations which could produce stirring and/or emulsifying in the liquid body, but also providing mechanical means for setting in motion the various liquid flows to be passed through by these flows only downstream of their final separation, and means adapted to reduce the effect of the turbulence induced by the wave motion on the liquid flows being treated, in addition to special design features and devices.

A further feature of this invention is the possibility to be readily disassembled in order to make it easily transportable along roads, and then assembled again near the usage location.

Still according to this invention, the process is such that it can be followed through automatic and/or radio-controls to the operating components of the apparatus wherein it is performed, whereby continuous attendance of personnel on board may not be required. In this way it has been made possible, on the one hand to provide the apparatus with qualities of further reduced weight, and on the other hand to enable the apparatus to be used in very rough sea conditions, when the apparatus already known would not be able to operate for personnel safety reasons.

A further feature of this invention is the fact that the oil transfer operation to the stocking facilities can be performed simultaneously to the forward motion of the apparatus, or while the latter is at a standstill, without having to interrupt the collecting operations.

A further particular advantage of this invention relative to the state of the art resides in the possibility to adjust the plurality of operating parameters to the variable conditions associated with each particular pollution reducing operation, such as the roughness of the sea, the density and thickness of the oil layer, the removal velocity, the allowable residual pollution, and so on, in order to attain an optimum operation flexibility. Finally, the apparatus is highly seaworthy, in terms of ability to maneuver and of sea resistance.

The method according to the present invention is characterized by the features recited in claim 1 and the apparatus for putting in practice the same is characterized according to claim 8.

BRIEF DESCRIPTION OF THE DRAWINGS

Further features and advantages of the method and apparatus according to this invention will become more apparent from the following description of some embodiments thereof, made for exemplary and non limiting purposes only, and referring to the attached drawings, wherein:

FIG. 1 is a general top schematic plan view of the whole apparatus;

FIG. 2 is a side view thereof;

FIG. 3 and FIG. 4 are two schematic cross sections of the apparatus, taken at two different trims, as it is better described in the following;

FIG. 5 shows only for illustrative purposes of the process a longitudinal section in a vertical plane of the part of the structure shown at B, taken e.g. along line V—V of FIG. 3, wherein the components relating to a particular embodiment have been shown at the instant when, outside of the basin B, the wave motion has raised up to $L_1$, the average level usually corresponding to the level $L_3$ within B;

FIG. 6 illustrates more in particular the detail shown at E in FIG. 5;

FIG. 7 is the same section of FIG. 5, but it indicates operating components shown in more detail in a particular embodiment;

FIG. 8 shows a plan view of part B of the embodiment of FIG. 7;

DETAILED DESCRIPTION OF PREFERRED EMBODIMENTS

Figure 9:
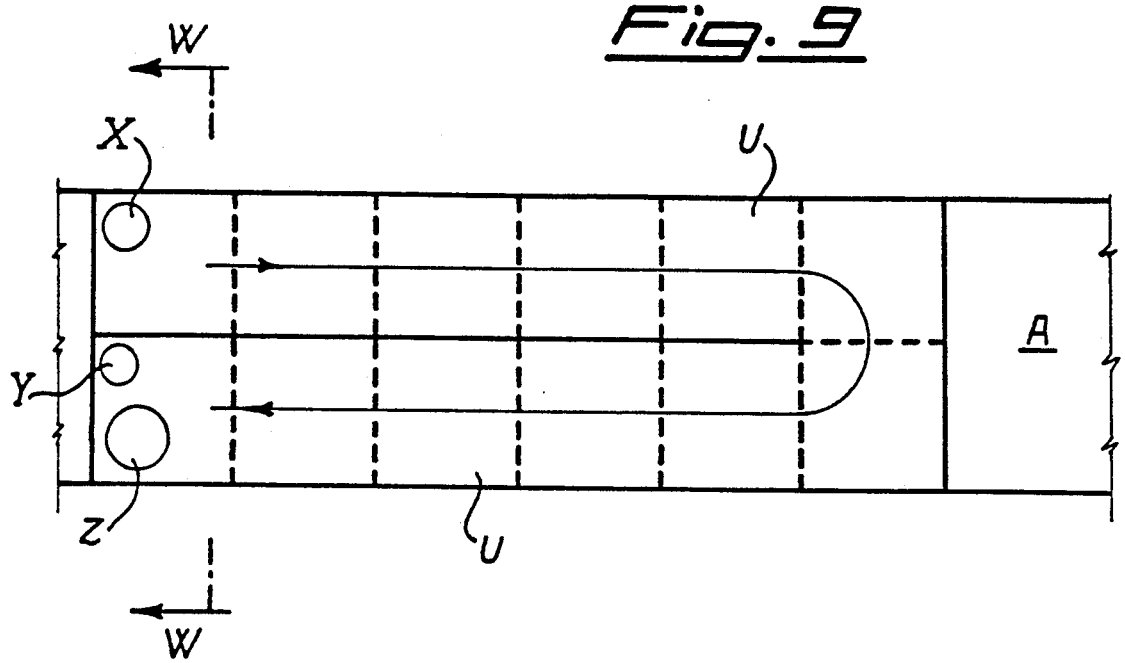
FIG. 9 is a schematic plan view of one of the hulls A, provided with a plurality of collected liquid decantation tanks.

The apparatus according to the invention is comprised of a floating structure including substantially five structural bodies among which there are two side hulls A of the assembly, located symmetrically relative to the longitudinal symmetry plane of the apparatus, which plane is shown in chain lines in FIG. 1, said hulls having a substantially elongated and narrow parallelepipedal shape, suitably tapered at the front and rear ends thereof. It should be noted that in the following description, the direction of the apparatus indicated herein towards the left side of the figure by arrow F, will be defined "navigation direction", for non-operating transfer trips of the apparatus, while the opposite one, towards the right side of the figure, shown by arrow F', will be defined "collecting direction" and the apparatus moves "astern" in the latter direction.

Between side hulls A there are located three central bodies, and among the latter a body shown at B, or basin, being shaped as a generally parallelepiped tank with no lid, connected to adjacent bodies A in a non rigid, but in a vertically sliding fashion, by means of special guide means, with the possibility of being fastened in a particular position. FIGS. 3 and 4 schematically show two examples of different trims taken by the apparatus, with body B located at two different levels relative to the floating line LG, during navigation and during a collecting operation respectively.

Body C, or central hull, is located between the pair of side hulls A, in the region towards the navigation direction, and it forms the bow part during the transfer operation according to arrow F, while, together with said hulls A to which it is rigidly connected by means of disassemblable connecting means, known per se (not shown), it also forms the main frame of the apparatus which is driven by the pair of propellers shown at D in FIGS. 1 and 2.

Eventually, body M, which substantially accomodates machinery, controls, instrumentation, and so on, is connected to the other parts A and C of the hull, preferably in a raised position relative to the latter.

The five parts mentioned above may be disassembled from each other, and each one of them is so sized as to make the same normally transportable along roads. Bodies A are shaped in such a way as to create a minimum disturbance on the fluid flow ahead of basin B, i.e. in the collecting channel K. As it is shown in FIG. 2, both bodies A extend vertically below the floating line in a lesser measure compared to body C, in order to contribute to a wide floating figure with relatively reduced thrust. The weights of the apparatus are kept to a minimum and in particular those of the side tanks A are concentrated towards the center of gravity, in order to reduce the weight moment of inertia, while the floating surface is very much extended, in order to increase the geometrical moment of inertia. In this way, it is enhanced the ready adaptability of the structure to the wave profile so that, especially for the highest waves, the structure follows readily the movement, by reducing the difference of level between the instant height of the wave and the inlet edge ($L_2$) of the stream into the apparatus. Reducing such a difference (conjointly with the reduction that may be obtained through an interlocking relationship of the basin height with respect to the wave profile, better explained later) involves a reduction of the difference between the average level ($L_3$) of liquid in the basin and the instant one ($L_1$) of the outside surface, varying with the waves, so that if such a difference could be zero at each instant no stirring or emulsifying action could occur, contrary to an apparatus of the type which, like the one disclosed in U.S. Pat. No. 4,119,541, provides for a constant difference of level between inside and outside of the basin, even in absence of waves.

As clearly shown in FIGS. 1, 2, 3 the floating figure is extended ahead (according to the direction of arrow F') whereby its center of gravity is displaced in the forward direction in order to reduce the radius of the rotation the blades 5 or bulkhead $P_m$ would be subjected to by the structure oscillation relative to the waves, thereby reducing the immersion stroke that higher waves would produce thereon due to the rotation of the entire structure. Such an arrangement intends to achieve the same result of increasing the readiness of the above-mentioned rotation, thus contributing to keep as lowest as possible the difference of liquid level between the inside and the outside of the basin (the latter according to the wave).

The space wherein basin B is received is enclosed on the sides and in the navigation direction by the walls defining bodies A and C, which extend also above the floating line. In order to limit the internal wave motion, the basin is divided in a plurality of cells extending for the whole depth thereof, and defined by vertical transverse bulkheads $P_1$, $P_2$, ... and longitudinal bulkheads 14 (see FIG. 8) the latter ones of which extend also above the floating line, while the transverse ones, except for the (outer) one towards F, end below said line, and preferably at a height close to that of bulkhead P defining the basin in the working direction.

Basin B is made vertically movable by known type actuators (not shown) whereby it may be positioned either at the two different positions of oil transfer or collection, as it is shown in FIGS. 3 and 4, or also, if the actuators are controlled by a suitable sensor, that the basin is positioned in a continuously variable position in order to follow the incoming wave profile.

Referring now to FIG. 5, concerning the first simplified version of basin B, which is shown in longitudinal section therein, there is shown on the right the first of a plurality of transverse bulkheads, shown at P, whose upper edge is positioned at level $L_2$ which varies according to the vertical motion of a slidable part $P_m$, or sluice gate belonging to said bulkhead P.

A sensor positioned outside and ahead of the basin, senses suitably in advance the variable height $L_1$ of the incoming outer liquid, and adjusts, by means of automatically controlled actuators, the level $L_2$ of $P_m$, whereby the difference $L_1-L_2$ is as much as possible constant, having a value which can be determined each time by the operator.

The layer of liquid having a thickness $L_1-L_2$, which flows over sluice gate $P_m$ arrives inside basin B wherein there is maintained an average level $L_3$, lower than $L_2$ and desirably equal to the average level at the outside, from which intakes a high flowrate pump G (shown in FIG. 7) through possibly adjustable suction ports F, located close to the bottom of the basin. Thereby water withdrawal is obtained only from the lower layers, with consequent oil enrichment in the surface layer immediately below level $L_3$. It should be noted that there will be provided at least a suction port F in each of the chambers formed within basin B by transverse bulkheads $P_1$, $P_2$, and so on, in communication with each other in the upper region through openings E. In this way, in each of the chambers in which the bulkheads $P_1$, $P_2$, $P_3$, etc. divide the basin, while the liquid of the upper layers flows over said bulkheads the water of the lowest layers is discharged from the bottom of the various chambers, water that has reached such layers by lowering due to the pump sucking and leaving at the surface the oil from which was already separated, as this was stratified in the upper layer and concentrated therein. All this without the need for water or oil of passing through stirring or turbulence regions, or the presence of means which may cause the two fluids to mix together, thus negatively affecting the pre-existing separation. In the passage mentioned above, the liquid turbulence, or the motions thereof, are dampened by a device that, while not providing a relevant obstacle to the liquid flow directed towards the left, above the threshold, substantially prevents a possible, even transient backward flow in the opposite direction, in the meantime adding to the dampening effect of the wave motion inside the basin. As it is shown in FIG. 6, said device is preferably comprised of a rectangular sheet or "curtain" 0, extending along the whole threshold width, and preferably divided into a plurality of sections, both breadthwise and heightwise, which besides covering the whole threshold depth, extends also above the average floating level, preferably to a maximum level which can be reached by the liquid, in operation, above the threshold. Each one of the parts comprising said sheet is made of a very flexible, preferably thin and resilient material, substantially sealingly connected along one of the horizontal sides thereof, to a member R parallel to the threshold edge, and fixedly positioned relative to the structure, whereby sheet 0, or the entire assembly of flexible members comprising the latter and fixedly connected to points of the structure, when pushed by the flow overflowing the threshold to flex at right angles thereto, yields opposing only a negligible resistance (see FIG. 6) and when it is pushed, for instance by a wave motion internal to the basin, in the opposite direction, it is brought first to close the fluid passage above the threshold and then, once said position has been reached, it remains constrained thereto until there is a push in said direction, by means of suitable stops N provided for said purpose. Said stops will be such as to give anough strength and rigidity to flexible sheet 0 resting against the same, while not introducing any disturbance in the flow above the threshold, being for instance under the form of a plurality of stop abutments or of a stiff net having suitable wire and mesh size.

In the latter chamber on the left there is provided a further transverse element illustrated as a bulkhead of a variable height by means of sluice gate $P_n$ manually or automatically settable in order to maintain the upper edge thereof at a level $L_4$, lower than the average level $L_3$ of the surrounding liquid by an entity determined by the operator. The automatic variation may take place through a motion coordinated in order to follow continuously and immediately the liquid level instantaneously present in the last basin chamber, in order to eliminate or to strongly reduce the variations in the threshold immersion depth provided by the upper edge of sluice gate $P_n$ for intake in a chamber I relative to the instant level in that region of the basin, and consequently the variations in the flowrate of the liquid overflowing from $P_n$ into I, for admission to the subsequent treatment. In that way, in chamber I called also "header" possibly divided in the transverse direction, there sets up an incoming flow of an oil/water mixture, very rich in oil.

The liquid entering header I is withdrawn through ports H, under a variable flowrate, in order to keep the surface between the levels $L_5$ and $L_6$, maximum and minimum respectively, at a level suitably selected and such that, relative to level $L_4$ it is lower by a preferably small amount, in order to reduce to a minimum the unavoidable, slight turbulence induced by the overflowing, but in the meantime large enough to prevent substantial backflows of liquid from the header to the basin, caused for instance by motions of the structure, or by a wave motion possibly taking place within the basin.

Figure 10:
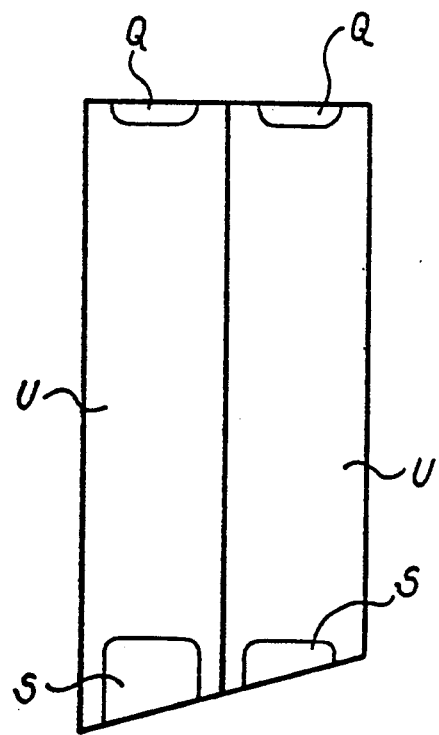
FIG. 10 shows a cross section of a hull A, taken along plane W—W of FIG. 9.

There is provided at least two ports H, one on the right and one on the left of header I, and each of them is connected by means of suitable diameter hoses to the respective flange, shown at X (FIG. 9) of the first tank included in said plurality of tanks U, located on the same side, and inside each one of the side hulls A. In the drawings, an array of twelve tanks has been shown to indicate that therein not merely a "storing" operation is provided but an actual treatment as described in the following. Each one of said tanks U, for both arrays, is in communication with the following one through passage slots located at the top and at the bottom, shown at Q and S respectively, as it is illustrated in FIG. 10. In the last tank of each array, a suitable intensity of vacuum is provided in order to obtain total filling to the top of the twelve tanks with the liquid withdrawn from header I through ports H. The last tank of each array is provided with a raised dome, shown at Z in FIG. 9, on top of which there are provided pipes for oil and air suction, the automatic vacuum control mechanisms, and the liquid surface level indicators, all of them being already known. While the vacuum is maintained, also a total filling of the twelve tanks U with an oil/water mixture is maintained. This is only a small fraction of the total mass of liquid entering the basin B over the separating element $P_m$, whereby it has a very small flowrate and due to the long, slow, non turbulent crossing through the array of tanks, enables only oil to concentrate at the top, and only water to concentrate at the bottom. If water is withdrawn from the lower part of the last tanks U, through flanges Y (FIG. 9), the top portion of the same tanks will fill up with oil. The separation surface between water and oil will actuate, at a predetermined minimum position, the start and suction from dome Z, of an oil transfer pump, while the pump stop will be controlled by a signal derived from the maximum predetermined level of said surface. In fact, since the tanks communicate with each other also at the top, the oil/water separation surface comes to the same level in all the tanks U, and since only a single withdrawal position is sufficient for the suction of the collected oil, it will be possible to transfer the oil from the tanks even without interrupting the collecting operations. In addition, the fact that all the tanks are full of liquids, results in preventing both trim variations and reduction in stability which could reduce the speed with which the structure adjusts to the tallest waves, besides possible turbulence and shocks within said tanks, what would hinder the separation water/oil.

Oil withdrawal through tank Z can be performed by connecting the top portion of the tanks, by means of lines of pipe, with a small sump, preferably provided at a lower level compared to the water level maintained within header I, whereby the oil can flow thereto even only under the action of gravity. From said sump the oil is withdrawn by means of a pump, controlled according to known techniques, by two level indicators in order to control oil transfer towards the final oil stocking containers, so that, when the amount of oil contained in tanks U goes over a certain value, one of the sensors actuates the transfer start, and when said amount falls below another predetermined value, the second sensor controls the transfer stop. It should also be clear that, by decreasing the pressure within the system of tanks with respect to the atmosphere weighing on the basin, the level of the liquids contained therein can be made to rise above the one previously indicated, and possibly even above the basin level, being then possible to increase the useful height of the tanks mainly in order to increase the decanting and stocking capacity thereof. The purpose of this vacuum is clearly different from that used in DE-A-2 931 795, wherein air intake is only for sucking air collected in the chamber 40 and the suction therein has only the aim of causing the fluids to flow without passing through a pump or another device which could stir or whirl the mixture. In practice, in said raised dome Z on top of the last tank of each array in both hulls A, there is provided both the air suction outlet necessary to maintain said vacuum, and underneath the latter the collected oil withdrawal pipe, as well as the fittings for the level indicators and controllers. Furthermore, dome Z is also a liquid-filled volume which, like a plenum or a reservoir, compensates the level variations caused by changes in the incoming flow from header I, and by changes in water outgoing flow through bottom flange Y.

Referring now to FIGS. 7 and 8, there is shown in more detail therein a preferred embodiment as an example of the simplified and more general form of basin B shown in FIG. 5. P is still the front wall enclosing basin B on the front side, while the internal transverse walls are shown as 8. On the upper edge of P there slides an arc-shaped gate 1, substantially like a portion of a cylinder surface, extending all the way towards the floating surface. Gate 1 is hingedly connected to a stationary transverse shaft 2 by means of arms 3, radially converging toward the latter. At the upper end of movable gate 1 there is pivoted, along a shaft 4 parallel to shaft 2, a blade-like or blade member 5 facing out from the basin, and in particular towards the region shown at K in FIG. 1. In addition, blade 5 is rigidly connected to a system of floats 6 (and of springs not shown in detail), which keep the floats submerged on the average for about one half of the volume thereof. In that way, blade 5 is kept in a horizontal position, at a determined level $L_2 < L_1$, which can be set in advance by known means, already mentioned above, while describing the embodiment of FIG. 5, with ample possibility to move vertically, as allowed by the hinged connection relative to shaft 2, below floating surface $L_1$. In such a way, the average thickness of the liquid layer $L_1-L_2$ above blade 5 is kept relatively constant, independent of the wave profile. Any vertical translation impressed to blade 5 causes therefore a corresponding motion of wall 1 which slides tangentially and substantially sealingly along the upper edge of first wall or bulkhead P. Therefore, on the one hand blade 5 is able to freely follow the wave motion while on the other hand a relative sliding is provided between wall 1 and the edge of the vertical gate, in a substantially scaled fashion, and without any relevant friction.

The blade 5 and gate 1 assembly corresponds to the sluice gate $P_m$ of FIG. 5. Blade 5 is a member effecting a first separation of the liquid layer to be admitted to the basin, and it must remain substantially horizontal, while being able to perform vertical traverse motions, at right angles to the plane thereof, along part of an almost vertical circular path required by rotation of the rear supporting body comprising gate 1. Stationary wall P shields the lower portion of member 1 from the dynamic pressure of the water in that the upper edge is located at a very short radial distance from the cylindrical surface of said member, in order to ensure a good sealing against the entrance in the basin of water passing between the movable member 1 and the stationary part P.

It should be noted that the separating member, or blade 5, can be supported by a rear member 1 which, instead of having the shape of a cylindrical surface, has a substantially flat vertical shape, as shown schematically at $P_m$ in FIG. 5, constrained to slide in a parallel direction along stationary part P, with a minimum clearance, possibly providing known type seals, in order to improve the sealing action, and preferably a servomechanism of known type for actuating the whole system, so that the position of blade 5 readily follows, with little deviation, the varying wave level.

According to a further embodiment, the motion of blade 5 may be different from the substantially vertical one permitted by float 6. In fact, said blade may be pivoted directly on the stationary structure, by means of a horizontal shaft transversely arranged relative to the liquid flow, along a side thereof, or along an internal axis which does not need to pass by the center of gravity in order to reduce to a minimum the unbalance induced thereon by the dynamical force deriving from the relative motion of the water. The depth of the pivot connection will be equal or close to the average separation distance required for the surface liquid layer and a known type connection will be provided to a control system adapted to swing the blade front edge according to the wave profile variations. Flexible and water-proof connections will be further provided between the pivot shaft and the frame, located in such a way as not to interfere with the blade swinging motion.

In the embodiment of the invention shown in FIG. 7, basin B is divided in four regions 7a–7d, by means of substantially vertical and transversely arranged bulkheads 8 which extend from the basin bottom up to openings E in order to maintain continuity in the surface layer, with a simultaneous partitioning of the mass of water contained within basin B in order to reduce a possible turbulence or wave motion propagation. Close to the upper horizontal edge of bulkheads 8 there are provided substantially horizontal hinged flaps 9 which extend in such a way as to cover almost the entire width and almost a half of the length of the central regions 7b and 7c of basin B. Said flaps 9 are connected to known type damper means 10, such as piston dampers, in order to be able to oscillate at a predetermined average depth to dampen wave motions, while allowing the oil rich surface layers to pass thereabove. Damper means 10 absorb and dissipate part of the wave energy thus damping the wave motion. Each flap 9 is arc-shaped whereby, even at a position different from rest, they do not have substantially any influence on the motions of the overlying layers, while they hinder wave motions in the surrounding areas, and turbulence component coming from underlying layers.

The anti-backflowing or unidirectional openings E provided at the top of each bulkhead 8 have already been described in detail referring to FIG. 5 and, concerning the flexible "small curtains" 0, with reference to FIG. 6.

Basin B, further provided with already described longitudinal bulkheads 14, in order to reduce to a minimum possible transverse wave motions, is provided with a bottom duct 11, laid across said basin in the longitudinal direction, and having a front inlet 12 and a rear outlet 13 provided on the rear wall or on the basin bottom. Close to duct oulet 13 there is provided a pump means G performing liquid suction both from outside through intake 12, and from inside regions 7a–7d through transverse headers F connected to duct 11 and provided on the bottom of chambers 7a–7d. Headers F and intake 12 may be suitably choked by known means, in order to control, according to need, the amount of water sucked from outside or from the various chambers of basin B. To allow oil collecting operations to be performed either when the structure is at a standstill or proceeding at low speed, removable devices may be provided, each one being preferably in the form of a length of elbow duct to be attached to the outlet 13, in order to subject the disharged water iet to the proper amount of deviation, preferably in opposition among the jets, or downwards, so that the propulsion thrust action on the structure, due to the jet exhausted by pump G through oulet 13, is neutralized.

Within chamber 7d, where a higher concentration of oil has taken place, there is provided a flexible and waterproof hose 15 whose cross section is kept constant by means of a number of stiff horizontal rings wherein the one ring closest to the surface, shown at 15a in FIG. 7, is connected both to a vertically slidable positioning member (not shown in the drawing) preventing a ring overturning from the horizontal plane, and to a float system 16 provided to keep the hose intake at a predetermined and adjustable level underneath the free surface of the basin, whereby the liquid contained in area 7d continuously overflows into hose 15. Through the latter, under the action of gravity, the liquid reaches header I whereby it is subsequently subjected to the process previously described referring to FIGS. 5, 9 and 10.

It should be pointed out that the above processing operations may be repeated sequentially, by performing liquid separation and withdrawal from the uppermost layers, while the lower ones are rejected, no longer on substantially undisturbed water, but on that portion containing the oil layer which has already been subjected to preliminary concentration during the first or the following sequential treatment operations, and introducing the withdrawn pre-concentrated liquid again in one or more subsequent basins, for slowing-down and separation, wherein further operations are possibly carried out comprising slowing-down, water ejection from below, and surface withdrawal of liquid having an increased oil concentration.

As it was mentioned above, central basin B is connected to the structure by non-integral means, but through known type guides for a vertical sliding motion, in particular relative to the pair of side hulls A. Said motion may be provided through known power control means, both directed by the operator or by a signal taken from a dedicated sensor, whereby the vertical distance relative to the wave profile is not rigidly dependent upon the floating structure motion relative to the same profile, but may be adjusted continuously in order to reduce changes of said distance to a minimum. Said changes then substantially coincide, still referring to the wave profile, with those of that structure portion to which said blade or separating member 5 is connected. Displacements of the latter will then be controlled only to eliminate or to reduce those variations in the thickness ($L_1$–$L_2$) of the liquid layer admitted to B caused by the minor wave motions and by that part of the major wave motion which has not been compensated by displacing the basin or rotating the floating structure.

The consequence is that the instant differences of level between inside and outside of the basin are almost completely compensated by the structure rotation and the basin shift and for the remaining portion, extremely reduced, the relevant effects on the water layer thickness, thereby the flowrate entering the basin, are counteracted by the movement of blade 5. The vertical and longitudinal size of the basin is determined as a function of the water flowrate withdrawn from the bottom of the various chambers (in total, together with the flowrate entering the side tanks, corresponding to the flowrate running into the basin over the blade 5) so as to neutralize the stirring effect due to the turbulence produced by said residual fraction of instant difference of level with respect to the wave profile.

It should eventually be noted that the apparatus of the invention is shaped and arranged in such a way as to be able to navigate and to maneuver, during transfer trips wherein no oil collection is performed, in a direction opposite to that of the oil collecting operations, whereby the member that during said operations performs the first separation between the surface layers of the surrounding body of water, i.e. blade 5, during said transfer navigation, is located substantially astern of said floating structure. On the ether hand, the opposite end of body C, which during navigation comprises the bow, will be preferably shaped in such a way as to optimize the navigation qualities of the assembly concerning in particular speed and ability to manoeuver. At the same time, since the basin is vertically movable, it may be kept at the height position which better suits said navigation qualities, and possibly completely or partially emptied of water.

I claim:

1. A method for removing from the surface of bodies of water oily matters and floating matters in general, briefly designated as "oil", comprising the operation of preliminarly increasing the concentration thereof per unit of surface in the upper layers, relative to the initial concentration, by withdrawing water from the lower layers, wherein said preliminary concentration increasing operation is performed through the following elementary and contemporary steps of:

a) initially separating from the surface of the body of water a thin liquid surface layer of a minimum thickness ($L_1-L_2$), but still sufficient to certainly contain the whole amount of oil, simultaneously giving to the liquid of said separated layer such a relative speed as to forward it to the following treatment with a minimum or no turbulence;

b) introducing then the liquid of said separated layer into a basin (B) whose horizontal size relative to the cross section where the separation has taken place is such as to substantially reduce said relative velocity of the liquid flow, whereby a first decantation process is enhanced due merely to the density difference between water and oil floating substantially undisturbed thereabove, the average level ($L_3$) of liquid in the basin (B) being kept near to the average level of the body of water at the outside;

c) causing the water in the basin (B) to have a flow direction downward by sucking from the basin bottom the lower layers thereof, thus leaving the already separated oil at the surface, still increasing its concentration;

d) withdrawing from the basin surface, where the highest oil concentration is present, an upper layer liquid substantially deprived of water and forwarding the same to a further decantation treatment comprising passing at low speed through an array of tanks (U) communicating with each other the liquids withdrawn from those surface layers having a higher oil concentration, wherein a flow is maintained from the first tank (U) to the last, from which the water deposited at the bottom is sucked and discharged, while the oil is in turn withdrawn and sent to store, out of the top portion of said last tank (U).

2. The method of claim 1, wherein the lower layers of the water sucked from the lower basic (B) may be controlled so that ejection of said water can also be used to cause relative motion of said basin (B) on the surface of said body of water, the ejected water forming at least one jet which can be directed in such a way as to reduce propulsion thrust thereof.

3. The method of claim 2, wherein control is provided over the thickness ($L_1-L_2$) of the liquid layer being separated and sent to oil decantation and concentration, whereby said thickness is kept down to a minimum still ensuring that the whole amount of oil is separated and introduced in said basin (B), by changing said thickness ($L_1-L_2$) to readily conform the same to wave variations at the outside of said basin.

4. The method of claim 1, wherein control is provided over the thickness ($L_1-L_2$) of the liquid layer being separated and sent to oil decantation and concentration, whereby said thickness is kept down to a minimum still ensuring that the whole amount of oil is separated and introduced in said basin (B), by instantaneously changing said thickness ($L_1-L_2$) to readily conform the same to wave variations at the outside of basin.

5. The method of claim 1, wherein said liquid processing steps a)-d) are sequentially repeated by performing liquid separation and withdrawal from the upper layers, wherein a higher concentration of the oil layer is already present, due to previous processing operations.

6. The method of claim 1, wherein oil withdrawal by suction from the last of said tanks (U) is performed continuously and automatically, without any need to discontinue the collecting operations, using as a suction actuation signal the level reached by the water to oil separation surface within said tanks (U).

7. The method of claim 1, wherein inside the whole array of said mutually communicating tanks (U) there is drawn a vacuum through air suction from one of the tanks (U) in the array, whereby the complete filling of the tanks is ensured, thus rendering the fluid therein exempt from any effect due to the structure movement induced by the outer wave motion.

8. An apparatus for removing from the surface of bodies of water, oily matters designated in general as "oil", substantially comprising a floating structure (A, B, C, M) provided with propulsion means (D) permanently associated therewith, with a substantially horizontally oriented separating device ($P_m$, 5) lying between two vertical intake walls, said device being submerged in the water at a level ($L_2$) lower than the surface ($L_1$) of said body of water, a basin (B) in communication with said separating device and having a depth and a cross-section largely higher than the corresponding dimensions above said separating member, whereby the liquid flow entering therein is strongly slowed down compared to the relative velocity of entrance into basin (B), and partition means (8, 9, 14, 0) adapted to reduce the wave motion within basin (B), wherein the difference ($L_1$-$L_2$) is a minimum and adjustable, provided it is large enough to positively separate from the lower layers the whole layer of floating oil; the lower portion of said basin (B) is provided with suction ports (12, F) connected with suction means (G) and adapted to generate a water flow from the top towards a lower outlet (13) while keeping, inside said basin (B), an average level ($L_3$) being kept near to the average level of water in which the structure floats; means ($P_n$, I, 15) being further provided for withdrawing liquid from the surface layer inside basin (B) and close to the side thereof opposite to the one where said separating means are located, in order to send the withdrawn liquid, through a header (I), to a system of further decantation means (U), towards final separation and disposal, comprising at least one array of serially arranged tanks (U) communicating with each other in their lower part through ports (S), the first tank of each array communicating, through a passage (X) in the lowermost part thereof, with said header (I), while the last tank in the array is in communication, at the lower side thereof, with the suction (Y) of a water ejection pumping means, there being further provided means to withdraw the oil collecting in the upper part of the tanks, above the water flow.

9. The apparatus of claim 8, wherein said structure, in particular in the portion thereof closer to separating member ($P_m$, 5), is adapted to follow variations in the wave profile, as the weights thereof are reduced and concentrated, in order to keep to a minimum the overall weight moment of inertia of the structure, the floating surface is extended in order to raise the geometrical of inertia to a maximum, said structure being extended in such a direction as to approach the geometrical center of gravity thereof to the zone where is located the separating member ($P_m$, 5).

10. The apparatus of claim 9, wherein the basin (B) is divided, in a transverse direction, into a plurality of complete components operating in parallel, without any possibility of communication in the transverse direction; it is further divided, in the longitudinal direction, in a plurality of chambers (7a to 7d) which communicate at the bottom with said high flowrate suction means (G) and at the top with the adjacent chamber which follows in the direction of the liquid flow or collection flow, the partition means between two adjacent chambers in the longitudinal direction being comprised of a bulkhead (8) rising from the basin bottom to slightly below the waterline, to form a communication threshold (E) adapted to allow only the upper layers, already enriched in oil, to pass to the following chamber.

11. The apparatus of claim 8, wherein the basin (B) is divided, in a transverse direction, into a plurality of complete components operating in parallel, without any possibility of communication in the transverse direction; it is further divided, in the longitudinal direction, in a plurality of chambers (7a to 7d) which communicate at the bottom with said high flowrate suction means (G) and at the top with the adjacent chamber which follows in the direction of the liquid flow or collection flow, the partition means between two adjacent chambers in the longitudinal direction being comprised of a bulkhead (8) rising from the basin bottom to slightly below the waterline, to form a communication threshold (E) adapted to allow only the upper layers, already enriched in oil, to pass to the following chamber.

12. The apparatus of claim 11, wherein it includes, at each threshold (E), a device (0), adapted to substantially prevent any back-flow in the opposite direction, thus helping also to dampen the wave motion within the basin, without hindering, in the meantime, the normal flow of the liquid stream above said threshold (E).

13. The apparatus of claim 12, wherein said device (0) comprises one or more rectangular sheets extending over the whole width of said threshold (E) and for a height over the latter reaching above the floating line up to the maximum level the liquid can reach, said sheet being comprised of a flexible, inextensible, thin and resilient material, sealingly connected along one of the horizontal sides thereof to a member (R) parallel to the edge of threshold (E) and fixed to the structure, the opening defined by said threshold (E) being provided with a series of netlike type supports (N) against which said sheet (0) gets stopped in case of any back-flow generated by wave motions within basin (B).

14. The apparatus of claim 11, wherein it further includes devices (9, 10) adapted to dampen any longitudinal wave motion which might arise in the liquid contained in basin (B), within each chamber.

15. The apparatus of claim 14, wherein each of said devices comprises a pair of flaps (9) both of which cover substantially the whole width of the respective chamber and have a length shorter than half the chamber width, located below the liquid free surface within the chamber, with one edge thereof located very close to separation bulkhead (8) and parallel to threshold (E), and pivoted along said edge in order to swing about a substantially horizontal rest position, each flap being connected to known type damper means (10), adapted to dissipate the energy subtracted from the wave motion, in addition each flap being shaped in such a way as to be substantially unaffected by motions in the overlying layers, while it resists the wave motions in the surroundings.

16. The apparatus of claim 8, wherein said separating member comprises the top edge of a flat vertical sluice gate ($P_m$), slidingly and sealingly mounted relative to front wall (P) of basin (B).

17. The apparatus of claim 16, wherein the position of said separating member ($P_m$, 5) adapted to determine said level ($L_2$) is controlled at any moment depending upon the wave profile, by means of known automatic controls.

18. The apparatus of claim 8, wherein said separating member comprises a substantially horizontal rectangular blade (5), pivoted on one edge thereof to a horizontal shaft (4) transversely arranged to the flow, and a body (1) positioned behind said blade, having a substantially cylindrical surface connected by means of radial members (3) to a pivot shaft (2), parallel to said shaft (4) and integral with the structure, said blade (5) being connected to known means (6) adapted to keep it in a substantially horizontal position and at a constant and predetermined depth, whereby the blade motion is substantially always a vertical trasverse motion, and such as to transmit a rotation about said shaft (2) to said body (1), which is constantly in contact with the upper edge of said front bulkhead (P).

19. The apparatus of claim 18, wherein the position of said separating member ($P_m$, 5) adapted to determine said level ($L_2$) is controlled at any moment depending upon the wave profile, by means of known automatic controls.

20. The apparatus of claim 8, wherein said first separation member (2) comprises a rectangular blade directly pivoting on the structure, about an axis parallel to a transverse side thereof, at a depth equal or close to the desired average separation depth, a connection with driving means being provided in order to swing the front edge of said blade (5) upon variation of wave profiles, there being further provided a flexible and waterproof connection between said pivot shaft and the structure, in order to ensure a substantial seal without however interfering with the swinging motion of said blade.

21. The apparatus of claim 20, wherein the position of said separating member ($P_m$, 5) adapted to determine said level ($L_2$) is controlled at any moment depending upon the wave profile, by means of known automatic controls.

22. The apparatus of claim 8, wherein said withdrawal means for the liquids to be sent to further decantation and final separation means (U) comprises in the chamber (7d) at least one substantially vertical tube-like header (I) ending, at the top thereof, with a horizontal edge positioned at a controllable level ($L_4$), slightly lower than the average level ($L_3$) established in the basin (B) and at the opposite end thereof communicating through a port (H) with the first one, on each side, of an array of decantation tanks (U).

23. The apparatus of claim 22, wherein said header (I) has a top portion (15) comprising an extension having a fixed cross size and a widely variable vertical size, like a flexible and waterproof hose, stiffened by transverse mutually spaced rings, and ending at the top thereof with a top edge section (15a) slidable on a vertical guide in such a way as to remain, on the average, horizontal and submerged of a small and adjustable amount ($L_3$-$L_4$) relative to the basin free surface within said chamber (7d), by means of a float arrangement (16) which obliges said section (15a) to follow the level variations of the surrounding liquid.

24. The apparatus of claim 23, wherein the liquid level within said header (I) is kept at a height ranging between a minimum level ($L_6$) and a maximum level ($L_5$), owing to the exhaust flow through said port (H) and to the immersion depth ($L_4$) of said top edge (15a) which is adjustable depending upon the wave motion, forming a minimum level difference with said level ($L_3$) sufficient for preventing any back-flow of liquid from the header into the basin.

25. The apparatus of claim 24, wherein automatic controls are adapted to follow continuously and immediately the level within chamber (7d).

26. The apparatus of claim 8, wherein said tanks (U) of each array communicate with each other also through the top part thereof, whereby the water to oil separation surface reaches the same level in all the tanks, and therefore a single withdrawal point is sufficient to perform the suction of the collected oil az the top part of the tanks.

27. The apparatus of claim 26 wherein one tank (U) of each array is provided with a raised dome (Z) wherein there is provided both the air suction port to generate the vacuum within the system and, below the latter, the collected oil withdrawal tube, as well as fittings for level indicators and controls, said dome (Z) providing as well a plenum filled with liquid and adapted to compensate, in a reservoir-like fashion, the level variations, wherein in any case the closed-top tanks filling is ensured, the array tanks (U) is kept at a lower pressure than the atmosphere and the level of liquid in tanks is higher than the outside surface and in the basin (B) as well as, in said raised dome (Z), with respect to the closed top of the tanks.

28. The apparatus of claim 8, wherein each tank (U) of said arrays is closed at the top, whereby it is prevented that the motion, especially pitching, induced by the waves on the structure, will cause stirring and mixing of the liquid in the tanks, what would hinder decantation, with air vents provided with check valves, each tank (U) being kept completely full of liquids, means being provided to perform air suction at the last tank of each array.

29. The apparatus of claim 28, wherein one tank (U) of each array is provided with a raised dome (Z) wherein there is provided both the air suction port to generate the vacuum within the system and, below the latter, the collected oil withdrawal tube, as well as fittings for level indicators and controls, said dome (Z) providing as well a plenum filled with liquid and adapted to compensate, in a reservoir-like fashion, the level variations, whereby in any case the closed-top tanks filling is ensured, the array tans (U) is kept at a lower pressure than the atmosphere and the level of liquid in tanks is higher than the outside surface and in the basin (B) as well as, in said raised dome (Z), with respect to the closed top of the tanks.

30. The apparatus of claim 8, wherein said high flow-rate suction means (G) is provided by the same propellers (D) for structure propulsion, and in that, at the withdrawn water ejection ports (13), removable devices may be provided in order to deviate the jet or the jets, to take the corresponding propulsion thrust down to zero.

31. The apparatus of claim 8, comprising a structure substantially formed of independent and mutually connected, divisible parts, each one of them having such dimensions as to allow the same to be transported along roads, including a central portion formed of said basin (B) containing all the internal components; two symmetrical parts or side hulls (A) substantially containing the further decantation and final separation tanks (U); a part (C) comprising the central portion of the hull, located between the two side hulls (A) on the side of the transfer direction relative to said basin (B), adapted to form, with said side hulls (A), the actual structure of the hull; and a fifth part (M) wherein there is substantially received the machines, controls and instrumentation, located in a central position on top of the parts mentioned above, said parts (A) and (C) being shaped in such a way as to provide the apparatus with good sea-worthiness qualities when it navigates without performing an oil collecting function, said parts being further positioned in such a way as to define therebetween the room adapted to contain said basin (B), allowing for displacement thereof between an upper fixed position during transfer navigation, and a second lower movable position, during oil collecting operations.

32. The apparatus of claim 31, wherein said basin (B) is vertically movable with respect to the structure as it is slidably mounted on side guides to hulls (A) and driven by known means responsive to the major wave motions, whereby the changes of the distance of average level ($L_3$) in the basin from the instant wave profile of the body of water at the outside is minimized.

* * * * *